F. KLAPUT.
STREET SWEEPING AND COLLECTING APPARATUS.
APPLICATION FILED DEC. 27, 1915.
1,178,647.
Patented Apr. 11, 1916.
2 SHEETS—SHEET 1.
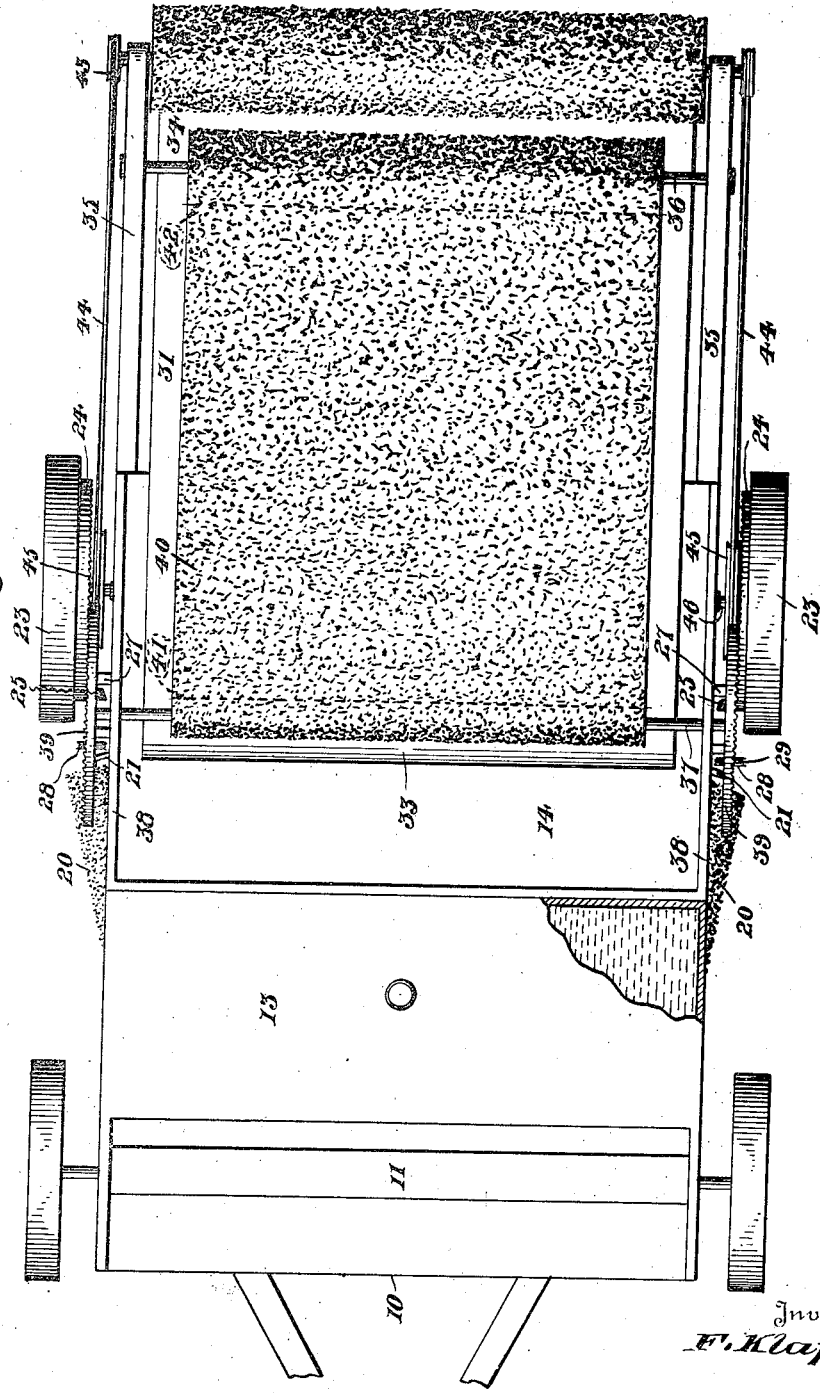

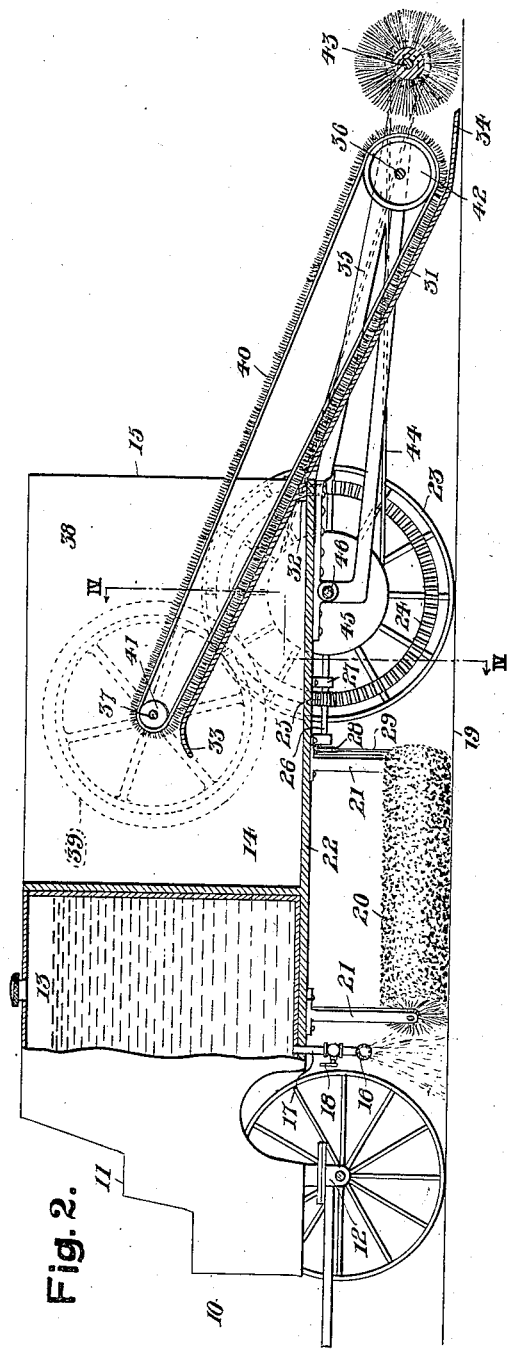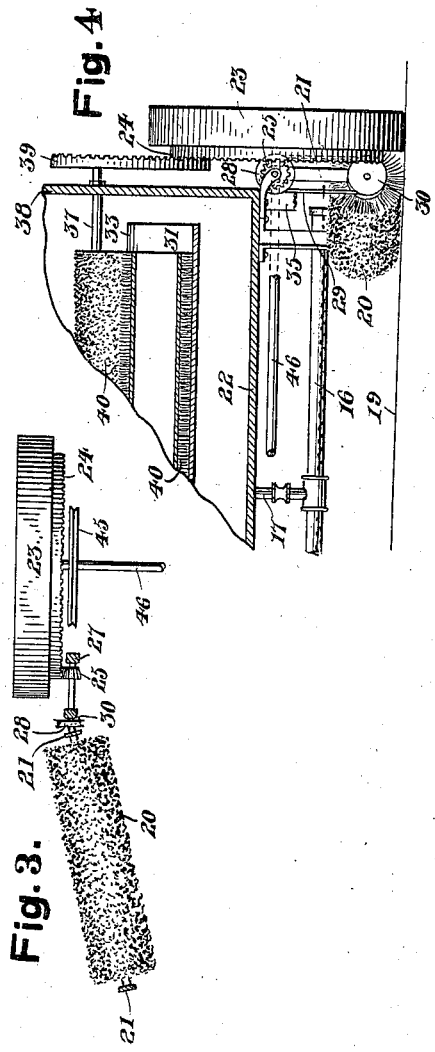

UNITED STATES PATENT OFFICE.

FRANCISZEK KLAPUT, OF WOODLAWN, PENNSYLVANIA.

STREET-SWEEPING AND COLLECTING APPARATUS.

1,178,647.  Specification of Letters Patent.  Patented Apr. 11, 1916.

Application filed December 27, 1915. Serial No. 68,748.

*To all whom it may concern:*

Be it known that I, FRANCISZEK KLAPUT, a subject of the Emperor of Austria-Hungary, residing at Woodlawn, in the county of Beaver and State of Pennsylvania, have invented certain new and useful Improvements in Street-Sweeping and Collecting Apparatus, of which the following is a specification.

This invention relates to certain new and useful improvements in street sweeping and collecting apparatus.

The primary object of the invention is the provision of a vehicle adapted for propulsion along the streets and arranged for sweeping up the refuse thereon and collecting the same within the vehicle, whereby the streets may be cleaned and the sweepings readily transported.

A further object of the device is the provision of a vehicle adapted for moistening the surface of a street over which the vehicle is traveling and thereafter to sweep the moistened surface and then transfer the sweepings to a transferring collection receptacle.

In carrying out this invention, it is arranged to provide a vehicle with surface-engaging brushes revolved in directions for sweeping the refuse toward an elevating conveyer brush, the said surface and conveyer brushes being simultaneously operated by the rear traction wheels of the vehicle.

With these general objects in view and others that will appear as the nature of the invention is better understood, the same consists in the novel construction, combination and arrangement of parts hereinafter more fully described, illustrated in the accompanying drawings, and then claimed.

In the drawings forming a part of this application and in which like designating characters refer to corresponding parts throughout the several views:—Figure 1 is a top plan view of the device partially broken away. Fig. 2 is a vertical longitudinal sectional view thereof, a portion being shown in side elevation. Fig. 3 is a top plan view of one of the surface sweeping brushes and the operating means therefor, and, Fig. 4 is a sectional view taken upon line IV—IV of Fig. 2.

In the present form of the invention, a four-wheeled vehicle 10 is provided having a driver's seat 11 at the forward end thereof and adapted to be propelled in any desired manner as by draft animals attached to a forward axle 12 thereof. A liquid container or tank 13 is provided in the forward portion of the vehicle while the rear portion thereof is in the form of a refuse receptacle or container 14 having an open top and an open rear end 15.

A sprinkler pipe or nozzle 16 is arranged beneath the tank 13 having communication therewith by means of a pipe 17 and controlled by a valve 18 and in which the fluid from the tank 13 is utilized for moistening the road-bed or other surface 19 over which the vehicle is traveling during the sweeping operation.

Laterally-arranged sweeping brushes 20 are positioned beneath each of the opposite edges of the vehicle 10 being obliquely arranged converging forwardly as best illustrated in Fig. 1 of the drawing and being positioned slightly in the rear of the sprinkler nozzle 16 and being journaled in arms 21 secured to the vehicle bottom 22.

The rear traction wheels 23 of the vehicle are each provided with an inner toothed rack 24 with which a pinion 25 of a stub shaft 26 constantly meshes. The said stub shafts 26 are journaled in brackets 27 carried by the vehicle bottom 22 and have pulley wheels 28 thereon over which belts 29 are passed and operatively attached to similar pulleys 30 upon the adjacent ends of the brushes 20. It will thus be understood that during the forward movement of the vehicle 11, the traction wheels 23 will be revolved in the direction indicated by the arrow in Fig. 2, which will impart revolutions to the brushes 20 for sweeping the refuse of the street inwardly and rearwardly beneath the vehicle.

An inclined plate 31 acting as a transferring board is secured mid-way of its length to the rear edge of the vehicle bottom 22 as at 32, one portion of the plate extending inwardly of the refuse container 14 and having a downwardly-curved upper end 33 while the outer portion of the plate 31 extends to a point adjacent the road surface 19 and has an angular end 34 lying substantially parallel with the road-bed and adapted for receiving the sweepings from the latter. Opposite frames 35 are carried by the vehicle bottom 22 and extend rearwardly of the vehicle in parallelism therewith, a shaft 36 being journaled between the said frames 35 rearwardly of the vehicle.

A shaft 37 is journaled through the opposite sides 38 of the receptacle 14 and has a side toothed gear wheel 39 upon each of its opposite ends, the said gear wheels 39 being in constant mesh with toothed racks 24 of the traction wheels 23. An endless conveyer belt 40 of brush formation passes over upper and lower drums 41 and 42 carried respectively, by the shafts 37 and 36, the said conveyer belt 40 being thus arranged in sweeping contact with the plate 31, engaging the latter between its lower receiving end portions 34 and its upper curved discharge end 33. During the forward movement of the vehicle and the turning of the traction wheels 23 thereof in the manner indicated by the arrow in Fig. 2, it will be seen that the gear wheels 39 will be revolved in the required direction for propelling the sweeping belt 40 so as to move upwardly upon the plate 31 in the sweeping operation and thus being serviceable in transferring to the receptacle 14 any sweepings fed to the belt over the receiving plate end 34.

A further surface sweeping brush 43 is journaled between the extreme rear ends of the frames 35 and is operatively connected by crossed belts 44 arranged outwardly of each of the frames 35 with pulley disks 45 carried by the rear axle 46 of the vehicle and adapted to revolve with the traction wheels 23. A forward movement of the vehicle 10 will revolve the rear brush 43 by means of the aforementioned turning disks 45 and belts 44 in a direction for sweeping the refuse from the road surface 19 forwardly upon the receiving end 34 of the plate 31 and in contact with the lower upwardly moving portion of the conveyer brush 40.

From this detailed description of the device and the operations of its parts separately, it will be understood that when the valve 18 is open and the vehicle 10 is drawn forwardly, the surface 19 being operated upon will first be sprinkled with fluid from the tank 13 and thereafter the sweeping brushes 20 will impel the refuse inwardly and rearwardly so as to pass beneath the plate end 34 and being positioned in the path of movement of the rear brush 43 will be forced upon the conveyer receiving plate 34 by means of the forward sweeping movement of the said brush 43. The conveyer brush 40 will then transfer the refuse up over the inclined plate 31 and into the receptacle portion 14 of the vehicle, thus allowing the vehicle to be propelled to a desirable point for dumping or finally depositing the collected refuse in emptying the vehicle for further use.

A sweeping device is thus provided which may be readily propelled over a street surface and will effect a complete cleaning of the street during a single trip thereover, thus obviating the necessity of employing a separate sprinkler, sweeper and refuse collector.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim as new is:—

A street sweeper including a frame, supporting wheels therefor, inwardly positioned gears carried by the supporting wheels, oppositely positioned pairs of hangers carried by the frame bottom, a stub shaft journaled in each pair of hangers, a gear carried by each stub shaft in mesh with the gears on the supporting wheels, brush supporting arms carried by the frame, converging inwardly and rearwardly impelling brushes journaled in said arms, alined pulleys carried by the stub shafts and brush axles, belts connecting the pulleys, an inclined conveyer and a rearwardly positioned brush.

In testimony whereof I affix my signature.

FRANCISZEK KLAPUT.